United States Patent
Owen

[15] 3,643,256
[45] Feb. 15, 1972

[54] SECONDARY RADAR SYSTEM
[72] Inventor: Philip Collinson Owen, Harlow, England
[73] Assignee: A. C. Cossor Limited, Harlow, Essex, England
[22] Filed: Mar. 3, 1970
[21] Appl. No.: 16,146

[30] Foreign Application Priority Data
Mar. 4, 1969 Great Britain...................11,569/69

[52] U.S. Cl. ...............343/6.5 R, 343/6.8 R, 343/100 LE
[51] Int. Cl. ...................................................G01s 9/56
[58] Field of Search.............343/6.5, 6.5 LC, 6.8, 6.8 LC, 343/100 LE

[56] References Cited
UNITED STATES PATENTS

| | | |
|---|---|---|
| 2,824,301 | 2/1958 | Levell et al............343/6.5 R |
| 3,122,737 | 2/1964 | Setrin....................343/6.5 R |

Primary Examiner—Malcolm F. Hubler
Attorney—Roberts, Cushman & Grover

[57] ABSTRACT

The ground station of a secondary radar system is provided with improved means for preventing transponder replies being triggered via reflecting surfaces. A special pair of reflection suppression pulses are transmitted directively in fixed azimuthal directions only, the second pulse being the larger, thereby generating a suppression gate in a transponder receiving these pulses. The transmission of these pulses is preferably made dependent on the azimuthal angle of the scanning aerial (FIG. 5).

8 Claims, 11 Drawing Figures

SECONDARY RADAR SYSTEM

This invention relates to secondary radar and concerns an improved ground station which transmits an interrogating pulse pattern designed to suppress returns from transponders interrogated via a reflecting surface.

In secondary radar systems, aircraft detection can easily occur over transmission paths involving reflections. This results from the high loop gain caused by the insertion of a transponder in the overall path. These reflections cause a responding aircraft to be displayed as an additional and false target in the direction of the reflecting surface. Such reflections are specular and they originate at plane surfaces when the effective aperture of the surface is sufficient to raise the reflected signals above receiver detection thresholds.

The invention will be explained with particular reference to the three-pulse I.S.L.S. (interrogator-side-lobe-suppression) system and the improved three-pulse system sometimes called a four-pulse I.S.L.S. system. The invention is not limited to such systems however. The explanation will be developed with respect to the accompanying drawings, given by way of example, and in which.

Figure 1:
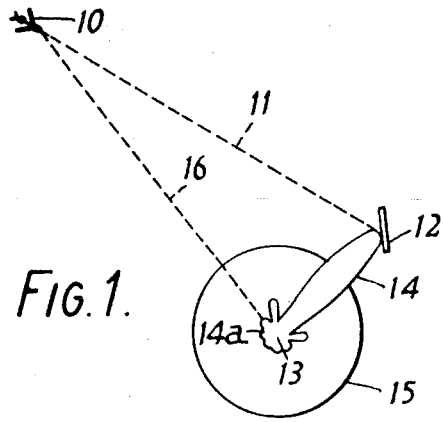
FIG. 1 illustrates a reflected interrogation.

FIG. 1 shows an aircraft 10 which can be interrogated over a reflected path 11 via a reflection surface 12 when the directional aerial of a ground station at point 13 is facing as indicated by the directional radiation pattern 14 thereof. The omnidirectional radiation pattern of the control pulse is idealized as a circle 15.

Figure 2A:
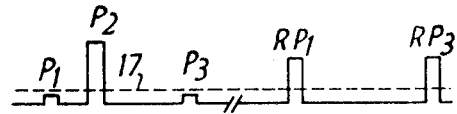
FIGS. 2a and 2b illustrate pulse patterns in known three-pulse and four-pulse I.S.L.S. systems.

In a three-pulse I.S.L.S. system the directional aerial transmits pulses $P_1$ and $P_3$ and the omnidirectional aerial transmits an intervening pulse $P_2$. The aircraft transponder is suppressed when the received pulse $P_1$ is equal to or less than the pulse $P_2$, typically for a period of 35µs, this being called the suppression gate. FIG. 2a shows the pulses as received by the aircraft in the situation of FIG. 1. $P_1$, $P_2$ and $P_3$ are first received over the direct path 16 (FIG. 1) but $P_1$ and $P_3$ are very weak as the direct path is only on a side-lobe 14a of the pattern 14. $P_1$ and $P_2$ are then received over the reflected path 11 and are designated $RP_1$ and $RP_2$ to shown that they are reflections. The reflected pulse $P_2$ received at the transponder is ignored in FIG. 2a as it is less than the reflected pulses $RP_1$ and $RP_2$. If, as shown in FIG. 2a, the received level of $P_1$ is below the transponder threshold level 17 a suppressor pulse pair $P_1P_2$ will in effect not exist, and therefore $P_2$ will not cause a suppression gate to be generated in spite of the fact that $P_2$ is greater then $P_1$. Therefore $RP_1$ and $RP_3$ will trigger a response from the transponder and the aircraft 10 will be displayed at the position of its virtual image in the reflecting surface 12.

Figure 2B:
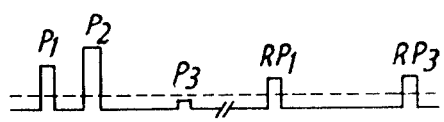

A partial solution to this problem is afforded by the known four-pulse I.S.L.S. system in which the fourth pulse is a pulse transmitted at the same time as $P_1$ from the omnidirectional aerial, the relative amplitudes of the pulses being so adjusted that on the main beam $P_1$ is greater than $P_2$ whereas off the main beam $P_2$ is greater than $P_1$. This gives rise to the situation in FIG. 2b in which $P_1$ now rises above the threshold level 17. A suppression gate is then generated at $P_2$ (greater than $P_1$ because the direct interrogation is off the main beam) and this gate suppresses the transponder for long enough to prevent any reply to $RP_1$ and $RP_2$, providing the difference between the direct and reflected path transmission times is not greater than the duration of the gate, e.g., 35 µs.

Figure 3:
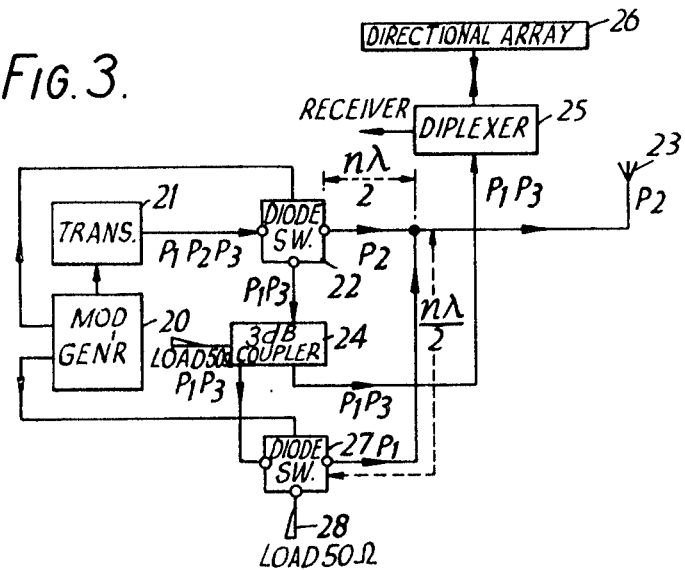
FIG. 3 shows a known four-pulse transmitter system.

The essentials of a known four-pulse I.S.L.S. ground station are illustrated in FIG. 3. A mode generator 20 provides pulses for timing the transmission of $P_1$, $P_2$ and $P_3$ which are generated by a transmitter 21. $P_1$, $P_2$ and $P_3$ are fed to a first diode switch 22 from which $P_2$ alone is fed to the omnidirectional aerial 23. $P_1$ and $P_3$ are fed to a 3 db. coupler 24 from which $P_1$ and $P_3$ pass to a diplexer 25 and the directional aerial 26. $P_1$ and $P_3$ are fed from another output of the coupler 24 to a second diode switch 27 which routes $P_3$ to a load 28 but passes $P_1$ as the above-mentioned fourth pulse to the aerial 23.

Figures 3A, 3B, 3C:
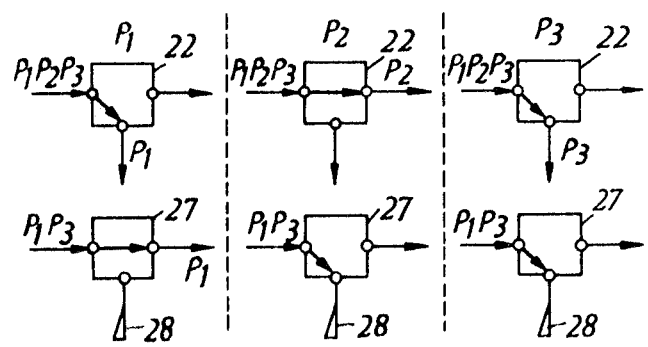
FIGS. 3a, 3b and 3c illustrate the switching sequence for FIG. 3.

The diode switches 22 and 27 are controlled by the mode generator 20 and assume the configurations schematically illustrated in FIGS. 3a, 3b and 3c during $P_1$, $P_2$ and $P_3$ respectively.

One disadvantage of this known system is that it suppresses every transponder off the main beam but within the range for which $P_1$ is above the threshold level for the duration of the suppression gate once in every repetition period. Since reflections may occur several tens of miles from the ground station, the omnidirectional power of $P_1$ has to be sufficient, to achieve the situation of FIG. 2b, that such suppression occurs over a wide region which may overlap with the region pertaining to another ground station. Hence the ground stations mutually render transponders unnecessarily unresponsive.

Another disadvantage of the known four-pulse I.S.L.S. system is that it does not suppress reflections originating from reflective surfaces close to the interrogator aerial system, such as might be caused by a protective fence surrounding a ground station. Such a surface can reflect a significant fraction of the energy from the main beam over a considerable range of azimuth angles, and produces a reflective pulse which immediately follows each pulse from the ground station. However, the transponders have echo suppression characteristics, which ensure that any received pulse which immediately follows and is smaller than the preceding pulse is individually suppressed. Thus, in the four-pulse I.S.L.S. system if the difference between the direct and reflected path transmission times is small and such that the reflected pulse $RP_1$ arrives between the direct pulses $P_1$ and $P_2$ and is greater in amplitude than the received level of $P_2$, then $P_2$ is suppressed and the transponder replies to the reflected interrogation pair $RP_1$ and $RP_2$.

The object of this invention is to provide an improved solution to the problem of reflection.

According to the present invention there is provided a secondary radar system ground station comprising a directional aerial for scanning in azimuth, an omnidirectional aerial and transmitting means coupled to the aerials for transmitting an interrogation group of pulses comprising at least one pulse transmitted via the directional aerial followed by a pulse transmitted by the omnidirectional aerial, the transmitting means being further coupled to at least one additional directional aerial viewing a fixed azimuthal sector and arranged to transmit two reflection suppression pulses in succession via the fixed directional aerial, the second of these pulses being larger in amplitude than the first.

It will be convenient to call these reflection suppression pulses $P_1'$ and $P_2'$. Since $P_2'$ is larger than $P_1'$ reception of these pulses will cause the suppression gate to be generated in a transponder. The pulses can thus be used to effect reflection suppression selectively in particular azimuthal sectors, so avoiding unnecessary suppression as in the prior art discussed above. Preferably the transmission of $P_1'$ and $P_2'$ is controlled in dependence upon the azimuthal angle of the scanning aerial so that such pulses are only transmitted in any azimuthal sector when the directional aerial is looking at any sector which gives rise to reflections in the first said sector.

If $P_1'$ and $P_2'$ are coincident with $P_1$ and $P_2$ respectively there is a risk of interference or beat frequency effects. It is, therefore, preferred that at least $P_1'$ should precede $P_1$. $P_2'$ can coincide with $P_1$ without undue risk of interference, or can fall between $P_1$ and $P_2$ with the advantage that the reflection suppression facility will automatically be cancelled if $P_1$ arrives on the main beam. ($P_1$ followed by $P_2'$ will not generate a suppression gate because of the transponder echo suppression characteristics, and because $P_1$ will exceed $P_2'$.) ($P_1$ followed by $P_2'$ will not generate a suppression gate because of the transponder echo suppression characteristics, and because $P_1$ will exceed $P_2'$.)

Figure 4A:
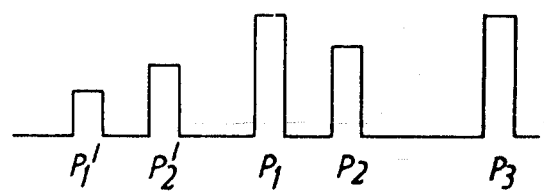
FIGS. 4a, 4b and 4c illustrate pulse patterns in a modified I.S.L.S. system embodying the invention.
Figure 4B:
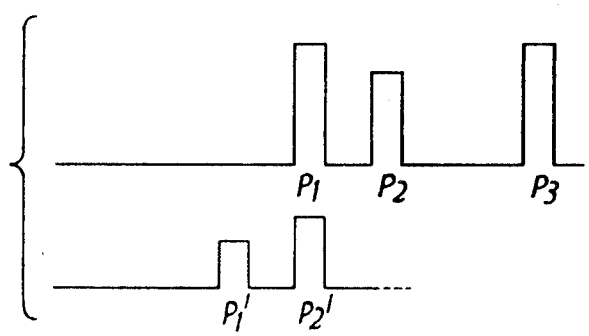
Figure 4C:
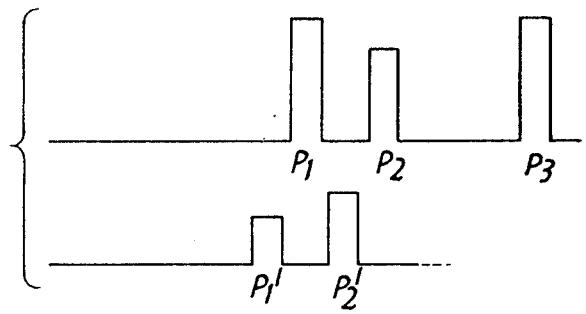

Thus the pulse sequence in a modified three-pulse or four-pulse I.S.L.S. system embodying the invention can be as illustrated in FIG. 4a or 4b or 4c. In FIG. 4a, $P_1'$ and $P_2'$ precede $P_1$, $P_2$ and $P_3$. $P_1'$ and $P_2'$ have the same spacing as $P_1$ and $P_2$ in all these Figures. In FIG. 4b $P_2'$ coincides with $P_1$. In FIG. 4c $P_1'$ still precedes $P_1$ but $P_2'$ falls between $P_1$ and $P_2$.

Figure 5:
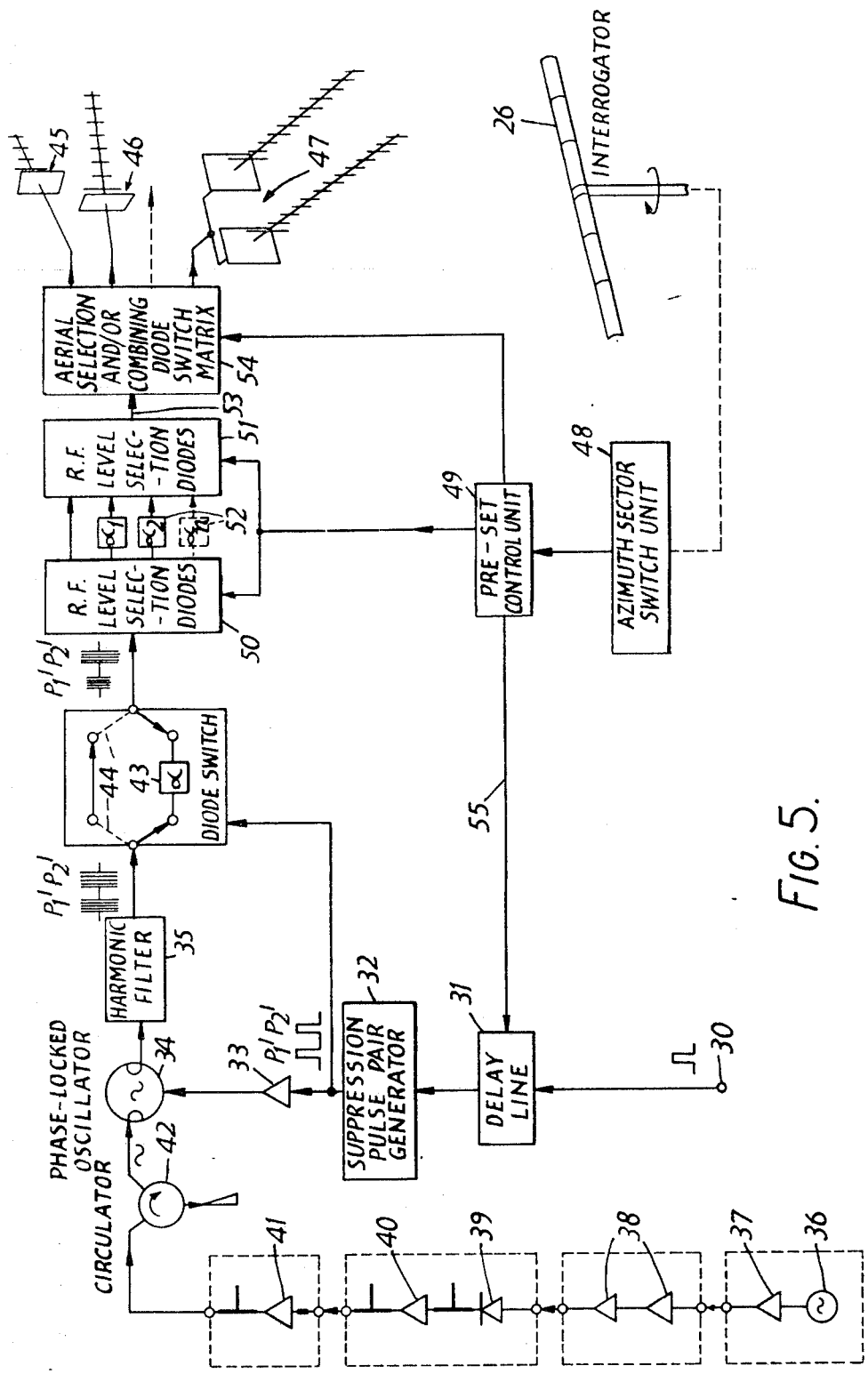
FIG. 5 is a schematic diagram of an embodiment of the invention.

FIG. 5 shows one embodiment of the invention, the units shown in FIG. 5 supplementing those shown in FIG. 3. It is assumed that the ground station operates (in known manner) with a video prepulse, applied at terminal 30. This pulse is used to generate the envelopes of $P_1'$ and $P_2'$ after a suitable delay provided by a delay line 31. $P_1'$ and $P_2'$ are developed by a pulse pair generator 32 which can comprise an arrangement of monostable multivibrators which provide $P_1'$ in response to the delayed video prepulse and provide $P_2'$ a little later, i.e., with the correct mode spacing. These pulses then pass through an amplifier 33 and modulate a phase-locked oscillator 34 whose output passes through a conventional harmonic filter 35 to provide $P_1'$ and $P_2'$ as R.F. pulses.

The phase-locked oscillator 34 can be locked from a crystal oscillator 36 feeding a buffer amplifier 37, diode drive amplifier 38, step-recovery diode 39 which effects frequency multiplication, U.H.F. amplifier and drive amplifier 40 and 41 and circulator 42. The oscillator 34 is pulsed by cathode modulation and phase locking to 1030 MHz±0.2 MHz is achieved by coherent injection into the grid-cathode cavity via the circulator 42.

The RF pulse $P_1'$ is then attenuated relative to $P_2'$ by means of an attenuator 43 preceded and followed by diode switches 44. These are controlled synchronously from the pulse generator 32 so that $P_1'$ passes through the attenuator while $P_2'$ bypasses the attenuator.

The pulses $P_1'$ and $P_2'$ are generated in every repetition period of the radar but they are fed selectively and with selectively adjusted power to fixed directional aerials, depending upon the current azimuthal angle of the scanning directional antenna 26. The fixed directional aerials are here represented as Yagi arrays 45, 46 and 47 although various other forms could be used, e.g., helical or polyrod. These aerials may be mounted around the support structure for the aerial 26 or on a separate mast and each is aligned in a particular azimuth where reflection suppression is required. Each fixed aerial is designed to give the most appropriate azimuth beam width.

The scanning aerial 26 is synchronized mechanically with a sector switch unit 48 which can comprise cam-operated sector switches or a digitizer. The unit 48 controls in turn a control unit 49 which operates various diode switches. These comprise firstly switches 50 and 51 preceding and following a plurality of preset attenuators 52. Thus for each azimuthal sector the correct power level for $P_1'$ and $P_2'$ on a line 53 is selected. The power level can be tailored to achieve the best results though in the absence of special requirements it is arranged that the gain power product is constant for each sector. If reflection suppression is required in a sector in the shadow of a large building or geographical feature it will be desirable to increase the power of $P_1'$ and $P_2'$ in that sector relative to the power in other sectors.

The diode switches further comprise a diode matrix 54 which, in each sector scanned by the aerial 26 route $P_1'$ and $P_2'$, correctly adjusted as to power, only to that one or those ones of the aerials 45, 46 and 47 which are to radiate as that sector is scanned.

The delay line 31 determines the time placement of $P_1'$ and $P_2'$ relative to $P_1$ and the delay can be enabled by the control unit 49 over line 55 to cause $P_1'$ and $P_2'$ to be generated in certain sectors of the aerial 26. The timing of the suppression pulses $P_1'$ and $P_2'$ can be varied relative to the pulses $P_1$, $P_2$ and $P_3$. The optimum position may be selected for a particular ground station and operational requirements of the secondary radar system in particular azimuth sectors. The arrangement of FIG. 4a, where $P_1'$ and $P_2'$ both precede $P_1$, would be most suitable for the suppression of reflections generated by surfaces close to the interrogator directional aerial. The arrangement of FIG. 4c, however, where $P_1$ falls between $P_1'$ and $P_2'$, allows the greatest direct/indirect path difference.

I claim:

1. A secondary radar system ground station comprising a directional aerial for scanning in azimuth, an omnidirectional aerial and transmitting means coupled to the aerials for transmitting an interrogation group of pulses comprising at least one pulse transmitted via the directional aerial followed by a pulse transmitted by the omnidirectional aerial, and the improvement comprising at least one additional directional aerial viewing a fixed azimuthal sector, the transmitting means being further coupled thereto and arranged to transmit two reflection suppression pulses in succession via the fixed directional aerial, the second of these pulses being larger in amplitude than the first.

2. A secondary radar system ground station according to claim 1, wherein at least the first reflection suppression pulse precedes the first pulse of the interrogation group.

3. A secondary radar system ground station according to claim 2, wherein the second reflection suppression pulse is coincident with the first pulse of the interrogation group.

4. A secondary radar system ground station according to claim 2, wherein the second reflection suppression pulse lies between the first and second pulses of the interrogation group.

5. A secondary radar system ground station according to claim 1, wherein both the suppression pulses precede the first pulse of the interrogation group.

6. A secondary radar system ground station according to claim 1, further comprising control means arranged to vary the timing of the suppression pulses relative to the interrogation group as a function of the azimuthal angle of the scanning aerial, without varying the interval between the two suppression pulses.

7. A secondary radar system ground station according to claim 1, further comprising switching means and a control unit therefor, whereby the two suppression pulses are transmitted selectively by the, or each, fixed directional aerial as a function of azimuthal angle of the scanning aerial.

8. A secondary radar system ground station according to claim 7, further comprising an adjustable attenuator responsive to the control unit to vary the amplitude of the two suppression pulses as a function of azimuthal angle of the scanning aerial.

* * * * *